United States Patent [19]

Schmidt

[11] Patent Number: 4,491,064
[45] Date of Patent: Jan. 1, 1985

[54] HOME ICE CREAM AND SOFT DRINK MAKER WITH AUTOMATIC AIR INJECTION

[76] Inventor: Richard B. Schmidt, 2100 S. Ocean Dr., Ft. Lauderdale, Fla. 33316

[21] Appl. No.: 484,972

[22] Filed: Apr. 14, 1983

[51] Int. Cl.³ .............................................. A23F 3/00
[52] U.S. Cl. .................................. 99/323.1; 366/101
[58] Field of Search ................ 99/323.1, 323.2, 323.3, 99/275, 348; 261/122, 64 R, DIG. 7; 366/101, 106, 107

[56] References Cited

U.S. PATENT DOCUMENTS

| | | | |
|---|---|---|---|
| 1,408,774 | 3/1922 | Peck . | |
| 1,912,439 | 6/1933 | Feller | 261/122 |
| 1,922,749 | 8/1933 | Roush | 261/122 |
| 1,978,176 | 10/1934 | Steenstrup | 62/114 |
| 2,120,297 | 6/1938 | Reinecke | 261/122 |
| 3,330,127 | 7/1967 | Wakeman et al. | 62/136 |
| 3,365,903 | 1/1968 | Lutz et al. | 62/177 |
| 3,479,835 | 11/1969 | Lane et al. | 62/135 |
| 3,660,988 | 5/1972 | Garavelli | 62/306 |
| 4,157,922 | 6/1979 | Luik | 366/101 |

*Primary Examiner*—Robert W. Jenkins
*Attorney, Agent, or Firm*—Oltman and Flynn

[57] ABSTRACT

Ice cream and soft drink producing apparatus for small establishments and residential use. It produces soft ice cream and soft drinks from a mixture of ingredients contained in the apparatus by infusion of carbon dioxide or similar gases contained in compressed form in canisters associated with the apparatus. A unique diffusion plate containing a large number of small diameter diffusion holes is positioned under the ice cream or soft drink mixture and above the inlet for the compressed gas, so that the gas, going through the diffusion plate is finely dispersed and injected into the mixture, without the need for rotating machinery such as paddles or beaters. A diffusion plate in which the diffusion holes are positioned to one side of the diffusion plate is especially effective in that it causes the ice cream or soft drink mixture to be agitated and rolled over for better exposure to the compressed gas.

In one version, the diffusion plate is positioned atop a sealing ring such that the ring may cover the perimeter holes with adjustable pressure against the ring resulting in selectively controlled texture of the final product. The ice cream maker is placed in the freezer compartment of a refrigerator where the soft drink or ice cream mixture is chilled or frozen as required.

6 Claims, 5 Drawing Figures

HOME ICE CREAM AND SOFT DRINK MAKER WITH AUTOMATIC AIR INJECTION

BACKGROUND AND PRIOR ART

The invention is related to apparatus for making ice cream and aerated soft drinks. It, more particularly, belongs to such types of apparatus that is suitable for home production of so-called soft ice cream and aerated soft drinks.

The use of injection of atmospheric air or carbon dioxide gas into a semifrozen mixture of ice cream base material by simultaneous stirring and freezing the mixture while admixing the gas has long been known as a method of producing an ice cream that is very softly textured and very palatable and attractive, and usually termed "soft ice cream".

A similar method of injecting gas, in particular carbon dioxide gas, into soft drink mixtures has been found to produce a soft drink that is very palatable and more attactive to most people than non-carbonized soft drinks.

Inventors have in the past devised various appararus for producing such aerated soft ice cream and soft drinks.

U.S. Pat. No. 1,408,774 by J.G.Peck, issued Mar. 7, 1922 describes a method of freezing ice cream by simultaneously freezing the ice cream mixture, beating it and injecting air or gas thereinto.

U.S. Pat. No. 1,978,176 by C. Steenstrup, issued Oct. 23, 1934 describes a method of making ice cream in an attachment to a household refrigerator.

U.S. Pat. No. 3,330,127 by A. H. Wakeman et al issued July 11, 1967 describes an aerating and refrigerating ice cream making apparatus with pressure responsive valve controlling the air supply.

U.S. Pat. No. 3,365,903 by H. G. Lutz et al issued Jan. 30, 1968 describes apparatus for preparation of soft ice or milk ice with air or gas injection to the ice cream mixture while it is being beaten or stirred.

U.S. Pat. No. 3,479,835 by C. Lane et al issued Nov. 25, 1969 describes a machine for producing and dispensing a semisolid, chilled, edible product that may be ice cream or a similar product based on other ingredients, and injects pressured carbon dioxide gas into the mixture.

U.S. Pat. No. 3,660,988 by G.Garavelli, issued May 9, 1972 discloses an ice cream making machine with a special container for combining and conveying the ice cream mix while a specific ratio of gas is added thereto.

The present invention discloses a novel apparatus for production of soft ice cream or soft drinks by means of gas injection that is uniquely constructed so that no rotating machinery or motors with shafts and paddles is required, but so that the injection of the gas under pressure through a suitably configured diffusion plate causes the mixture of ingredients to be agitated and kneaded by the force of the gas streams issuing from small apertures in the diffusion plate. Due to its mechanically simple and uncomplicated construction and its potentially small size, the ice cream maker according to the invention is especially well suited for home production of ice cream.

The invention permits the texture of the ice cream to be varied by means of a manual adjustment as described below in more detail in this specification.

OBJECTS OF THE INVENTION

It is therefore a primary object of the invention to provide apparatus for production of soft ice cream and soft drinks that is constructed such that gas may be injected into the mixture of ingredients without the use of mechanically operated paddles or beaters for stirring the mixture.

It is another important object to provide apparatus for the production of soft ice cream and soft drinks that dispenses the finished product by means of the gas pressure used for gas injection without the use of a mechanically driven pump.

It is still anothar important object to provide apparatus for production of soft ice cream and soft drinks that is so constructed that the amount of gas injected into the mixture is selectively controlled by means of an external, adjustable control knob.

It is still another object to provide apparatus that will produce soft ice cream wherein the texture of the ice cream may be varied by means of an external manual adjustment.

It is still another object to provide apparatus for production of soft ice cream and soft drinks that can be fabricated in a small size such that it may fit inside the freezer compartment of a home refrigerator.

It is still another object to provide apparatus for production of soft ice cream and soft drinks that may be mass fabricated of readily available materials and production methods.

Other objects and advantages of the invention will become clear in the course of the following detailed description with appended drawings and claims.

DETAILED DESCRIPTION

The invention is related to apparatus for making soft ice cream and soft drinks by means of infused compressed gas such as carbon dioxide or the like.

It is described in detail in its preferred embodiment in the following specification with appended drawings and claims.

It is to be understood that the invention is capable of other embodiments that are obvious to those skilled in the art to which it pertains and which are therefore within the scope of the invention.

Figure 1:
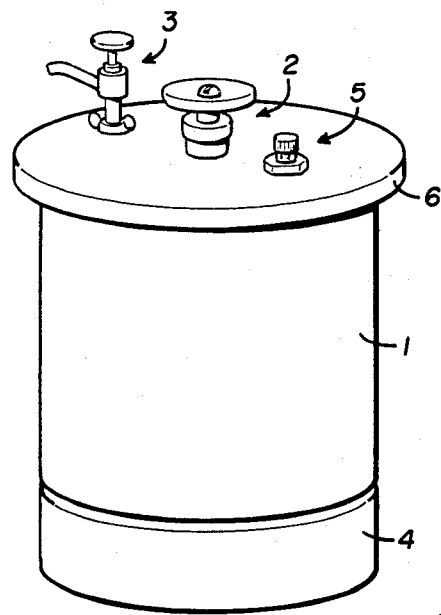
FIG. 1 is a vertical perspective view of the invention showing its main parts.

FIG. 1 is a perspective vertical view of the home ice cream and soft drink maker according to the invention, showing its main parts.

The ice cream and soft drink maker consists of a generally cylindrical container 1 that holds the ice cream and soft drink ingredients in its interior space, and a top cover 6 which is detachably attached in a gas tight sealed connection at its periphery to the top rim of the container 1 by means of locking lugs. A circular base assembly generally at 4 contains various apparatus and components containing the gas and its controls as described in more detail below. The base assembly 4 also is detachably attached at its periphery to the bottom ring of the container 1.

Figure 2:
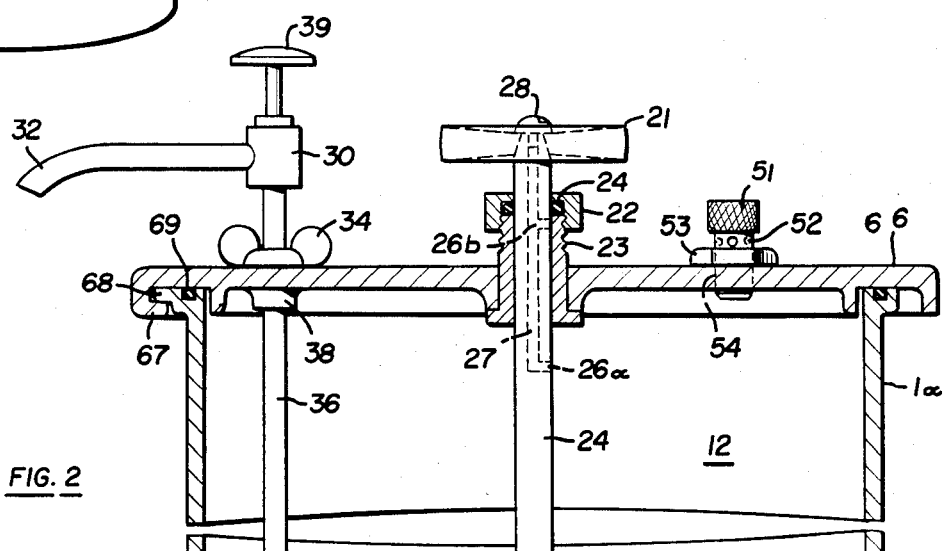
FIG. 2 is a vertical cross-sectional view of the invention showing its interior components.

FIG. 2 is a vertical cross-sectional view of the home ice cream and soft drink maker, showing its internal construction and its main components.

The container 1 has an interior cylindrical space generally at 12, bounded by a vertical cylindrical wall 1a, the detachable gas tight top cover 6 and a bottom plate 41 which is an integral part of the container 1. The container is constructed from material that is strong enough to contain an interior gas pressure of several pounds per square inch, and is heat conducting so that cold freezing air surrounding the container may be transmitted through its walls to the ingredients contained in its interior. The material of the container must also be such that it does not interact chemically with the ingredients and it must be capable of cleaning and washing as is usually required for the preparation of comestible products. Aluminum in some of its alloys has been found to be a suitable material for its construction.

The top cover 6 is, as stated above, detachably attached in a gastight sealed connection at its periphery to the top rim of the container wall 1a. A plurality of locking, inward projecting lugs 67 that are integral with the top cover 6 are in engagement with the underside of matching coordinated outward projecting lugs 68 that are integral with the upper rim of the container wall 1a and provide a mechanically sturdy connection between the container 1 and the top cover 6. The top cover 6 is attached to the container 1 by placing the cover on top of the container and turning the cover in relation thereto so that the lugs overlap and draws the cover downward against a cover O-ring seal 69 that provides a gastight seal between the cover 6 and the container 1. Other means of attaching the cover to the container may be employed such as a screw connection or any other suitable means.

A dispenser, generally at 3, serves to dispense ice cream or soft drinks contained under pressure inside the container. The dispenser consists of a dispensing riser pipe 36 disposed vertically inside the container with its lower open end 37 near the bottom of the container 1, and with its upper end extending through an airtight bushing 38 in the top cover. A wing nut 34 in threaded engagement with an externally thread upward projecting slotted extension of said bushing 38 operates to secure the riser pipe 36 rigidly and gastightly to the cover 6.

The upper end of the riser pipe 36 extends into a dispensing cock 30 with a dispensing cock control knob 39 and a dispensing spout 32. The dispensing cock 30 when opened by the knob 39 admits ice cream or soft drink, contained in the container 1 to rise, under the gas pressure in the container, up through the riser pipe 36, out through the open cock 30 and through the dispensing spout 32. The internal construction of the cock 30 is conventional and is well known from the art of control of fluids and is therefore not described in this connection since the invention is not directed to the construction details of the cock.

A diffusion and vent rod 24 is disposed generally centrally and vertically inside the container interior space 12 with its upper end extending upward through a gastight bushing 23 to a handle 21, which is secured to the vent rod with a screw 28. The diffusion adjustment and vent rod 24 serves two purposes namely: (a) that of providing a vent for the release of gas pressure in the container 1 and (b) that of providing means for adjusting the tension of a wing screw 101 which in turn exerts downward pressure against a diffusion plate 8. The collar nut 22 is threadedly in engagement with an external thread at the upper end of the bushing 23 and serves to contain and compress a sealing ring 24 against the upper circular surface of the bushing 23 so that the vent rod 24 may slide axially and in a rotary gastight motion inside the bushing 23.

The lower end of the vent rod 24 has a vertical slot 24a which receives a matching wing 101a at the top of the wing screw 101 so that the wing screw may be turned by turning the handle 21 at the upper end of the vent rod 24 externally to the container. The bushing 23 is secured to the cover 6 in a tightly fitting hole in said cover.

The upper end of the vent rod 24 has an internal vent channel 27 that connects two vent openings, the lower vent opening 26a and the upper vent opening 26b. In its normal lower position, the vent rod, as shown, is positioned in its lower position with the upper vent opening 26b positioned below the seal 24 so that there is no venting of gas from the container interior to the outside and with the lower end of the vent rod engaging the wing nut 101.

In operation, if gases contained under pressure in the container are to be vented to the outside in order to relieve the gas pressure in the container the vent rod is pulled vertically upward by the handle 21 a short distance, so that the upper vent opening 26b is moved to a position above the seal 24 while the lower vent opening 26a is still inside the container interior, whereby an escape channel for the gases in the container is provided.

A pressure relief valve generally at 5 (FIGS. 1 and 2) is provided in the top cover 6, and consists of a valve body 52 secured to the cover 6 in a tightly fitting threaded hole 54 and has internally spring loaded valve, the relief pressure of which is adjustable by the rotation of a knurled valve head 51. The construction and operation of the pressure relief valve is conventional and well known from the art of fluid control and need not be described in greater detail since the invention is not directed to the construction of the relief valve.

Figures 3, 4:
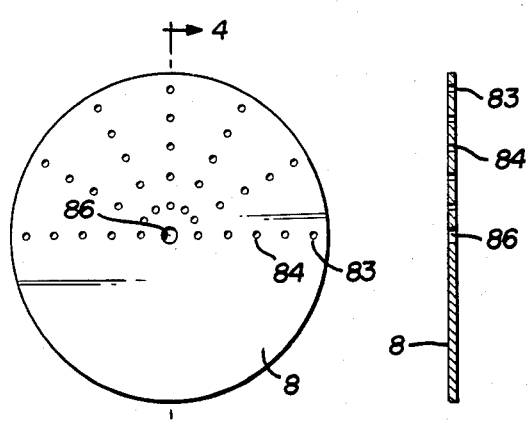
FIG. 3 is a horizontal view of the diffuser plate.
FIG. 4 is an edge view of the diffuser plate of FIG. 3 along the line 4—4 of FIG. 3.

The bottom 41 of the container is covered by a circular diffusion plate 8, the construction of which is important to the operation of the ice cream and soft drink maker, and is therefore described in greater detail by means of FIGS. 3 and 4. The diffusion plate 8 is perforated with a plurality of small diameter diffusion holes. The greater number of the holes are the inside holes 84 as opposed to the smaller number of outside perimeter holes 83. The outside perimeter holes are disposed along a semi-circular path formed by a diffusion plate O-ring seal 81 which is an elastomeric sealing ring partially contained in a circular groove 80 in the bottom plate 41. A central hole 86 in the diffusion plate is coordinated with the wing screw 101 so that the diffusion plate is positioned centrally in the container and secured by the head of the wing screw 101, the threaded portion of which is received in the matching threaded hole 102 in the depression 105 in the bottom plate 41.

In FIG. 3 the diffusion plate 8 is shown with the small diameter diffusion holes 83 and 84 disposed along radii. The holes however need not be located in any particular pattern, except the perimeter holes 83, which, as stated above, are disposed along the groove 80 containing the O-ring seal 81. Also, as shown in FIG. 3, all the holes are positioned on one side of a diameter for improved operation of the invention as described in more detail below.

Figure 5:
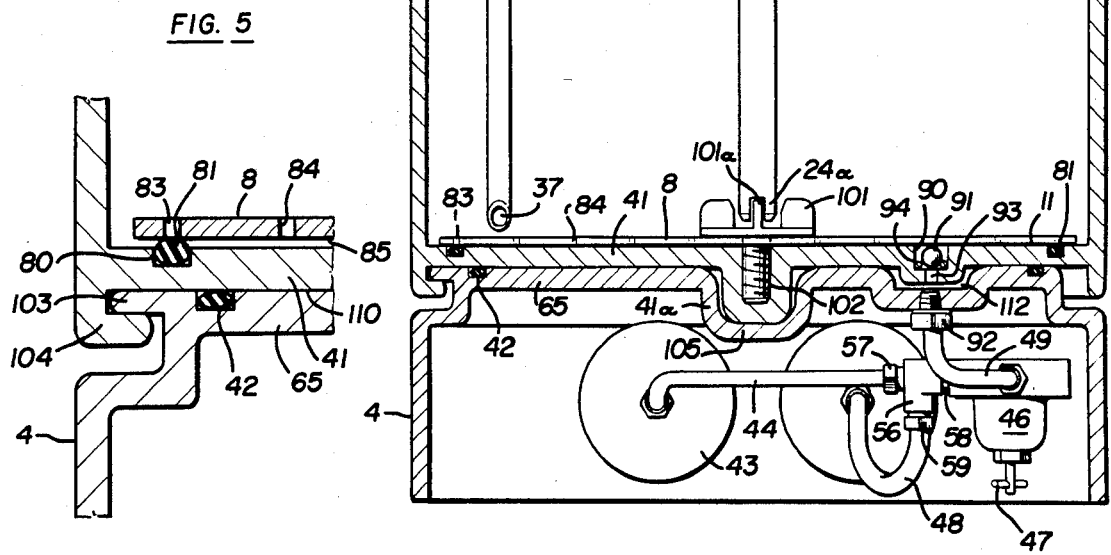
FIG. 5 is an enlarged cross-sectional vertical view of details of the connection between the bottom part of the container and the top plate of the base assembly taken along the broken line 5 of FIG. 2.

The tension of the wing screw 101 against the diffusion plate 8 may be adjusted so that, with little or no tension, the plate is resting loosely against to the O-ring seal 81 and separated from the bottom plate 41 by a small space 85, best seen in FIG. 5, which is an enlarged detail view seen along the dotted line 5 of FIG. 2.

If the wing screw 101 is turned clockwise it will exert more tension on the diffusion plate and the space 85 will be reduced until the screw is completely tightened, and the plate 8 is pressed against the bottom plate 41 with no space between the two, as shown in FIG. 2.

The base assembly 4 is an assembly of components that supply the gas under pressure to the mixture in the container 1.

The base 4 is detachably attached to the bottom rim of the container 1 by means of coordinated locking lugs 103 and 104 that are similar in construction to those provided between the cover 6 and the container 1, described above. The base assembly 4 has a base top plate 65 with a centrally located downward projecting indentation 41a that provides space for a matching downward projecting depression 105 of the container bottom plate 41, which, in turn, contains the threaded hole 102 for the wing screw 101 described above.

The base assembly 4 contains canisters 43 filled with a compressed gas, such as carbon dioxide or any other suitable gas, as merited. Two canisters are shown, each connected to a small manifold 56 with a number of inlet ports 57 and 59 by means of flexible sections of tubing 44 and 48. It follows that the number of canisters provided is immaterial to the scope of the invention.

The manifold 56 is connected at an outlet port to an inlet port 58 to manually adjustable pressure regulator 46, having a pressure control handle 47 and an outlet port connected, by means of a flexible tube section 49 to a tube fitting 92 which is threadedly attached to a hole in the top plate 65 of the base assembly 4.

Compressed gas is conducted through tube section 49 and tube fitting 92 to a one way check valve 94 consisting of a valve seat 93 with a ball 91 resting in the valve seat.

The ball allows compressed gas to be conducted upward through the check valve, but prevents downward flow of fluids in the direction from the container into the tube section 49 and the regulator 56.

A small air space 112 separates the tube fitting 92 and the one way check valve 94 so that the base assembly can be detached from the container 1 for cleaning and maintenance.

A base assembly O-ring seal 42 is disposed in a circular groove in the upper surface of the base top cover 65 in order to prevent compressed gas from escaping through the space between the top plate 65 and the bottom plate 41 of the container 1.

OPERATION

In operation, container 1 of the ice cream and soft drink maker is first loaded with the ingredients forming the ice cream or soft drink mixture. The top cover 6 is placed in its position atop the container and locked into position by turning it so that the lugs 67 and 68 lock together and hold the cover firmly and in a gas tight connection in place against the cover O-ring seal 69. Next the diffusion adjustment and vent rod 24 is pushed down into contact and engagement with the wing screw 101, which is tightened to a desired degree of tension by turns of the vent rod handle 21 so that the diffusion plate 8 is resting with its underside against the diffusion plate O-ring seal 81 with a moderate pressure.

Next, the dispensing cock 30 is closed by means of the handle 39, and the pressure relief valve 52 is adjusted by means of the knurled knob 51, so that it will respond only if the internal pressure in the container should exceed a preset safe value.

With the canisters charged with a suitable gas, such as carbon dioxide or any other suitable gas under pressure, the pressure regulator is set to provide a desired level of gas pressure depending upon the degree of carbonization desired by means of the pressure regulator handle 47.

As a result, gas flows from the canisters 43 through the regulator 46 and up through the one-way check valve 94 and through the small diameter diffusion holes 84 and 83 of the diffusion plate 8 and into the ice cream or soft drink mixture, which absorbs the gas and becomes carbonized.

With the small diameter diffusion holes 83 and 84 located at one side of the diffusion plate 8, the gas issuing from the holes imparts to the mixture a rolling and agitating motion that helps to disperse and distribute the gas content of the mixture.

The ice cream and soft drink maker is next placed in a cooling and/or freezing space such as the freezing compartment of a home refrigerator, where the mixture is gradually cooled or frozen while it is being impregnated with the gas.

When completed, the cooled or frozen carbonized mixture may be dispensed by opening the dispensing cock 30, through the dispensing spout 32.

In the way described, the ice cream and soft drink maker, according to the invention, is capable of producing soft ice cream or soft drinks even in a home or small establishment without the use of complex bulky machinery as normally employed in the production of such comestibles.

It should be understood that the invention could be constructed in other ways than described above. For example, the supply of gas need not be directly associated with the container but could be disposed in a separate location and connected therewith by suitable tubing.

Also in the same manner, the supply of ice cream or soft drink mixture could be undertaken from a source apart from the container.

I claim:

1. An apparatus for production of ice cream and/or drinks from a mixture of ingredients comprising:
    container means containing a mixture of ingredients;
    supply means for compressed gas;
    diffusion plate means containing a plurality of small diameter holes, disposed between said supply of compressed gas and said mixture;
    control means for controlling the flow of compressed gas from said supply of compressed gas through said diffusion plate into said mixture; and
    locking means consisting of coordinated lugs and a sealing O-ring for airtightly detachably attaching said container means to said supply means for compressed gas;
    said diffusion plate means being disposed near the bottom of said container means;

said supply means for compressed gas supplying compressed gas to said mixture contained in said container means;

said container means comprising a top cover, walls, and a bottom plate, with said top cover detachably attached to said walls;

said bottom plate having an aperture leading to said diffusion plate means such that said supply means supplies compressed one through said latter aperture to said diffusion plate means and said compressed gas enters the mixture through said small diameter holes in said diffusion plate means;

said supply means including at least one canister containing compressed gas;

a further O-ring disposed between the underside of said diffusion plate means and the top surface of said bottom plate; and a diffusion plate adjustment wing screw threadedly attached to a matching threaded hole in said bottom plate and securing said diffusion plate to said bottom plate with said diffusion plate tensioned against said further O-ring.

2. An apparatus as defined in claim 1 further comprising at least one pressure relief valve.

3. An apparatus as defined in claim 2 further comprising dispensing means for dispensing the contents of said container means, said dispensing means comprising:
 a dispensing spout;
 a dispensing cock; and
 a dispensing riser pipe, said dispensing riser pipe extending vertically upward from a point near the inside bottom of said container means through said top cover to said dispensing spout.

4. An apparatus as defined in claim 1 further comprising a diffusion adjustment and vent rod operatively engaging said diffusion plate wing screw, said vent rod extending from said wing screw through a gas tight bushing disposed in said top cover and further comprising a handle attached externally to said vent rod, said handle and vent rod operating to manually adjust the tension of said diffusion plate against said further O-ring.

5. An apparatus as defined in claim 4 wherein said diffusion plate further comprises small diameter perimeter holes, said perimeter holes disposed opposite said further O-ring.

6. An apparatus as defined in claim 5 wherein said small diameter holes are all disposed on one side of a diameter through said diffusion plate.

* * * * *